UNITED STATES PATENT OFFICE.

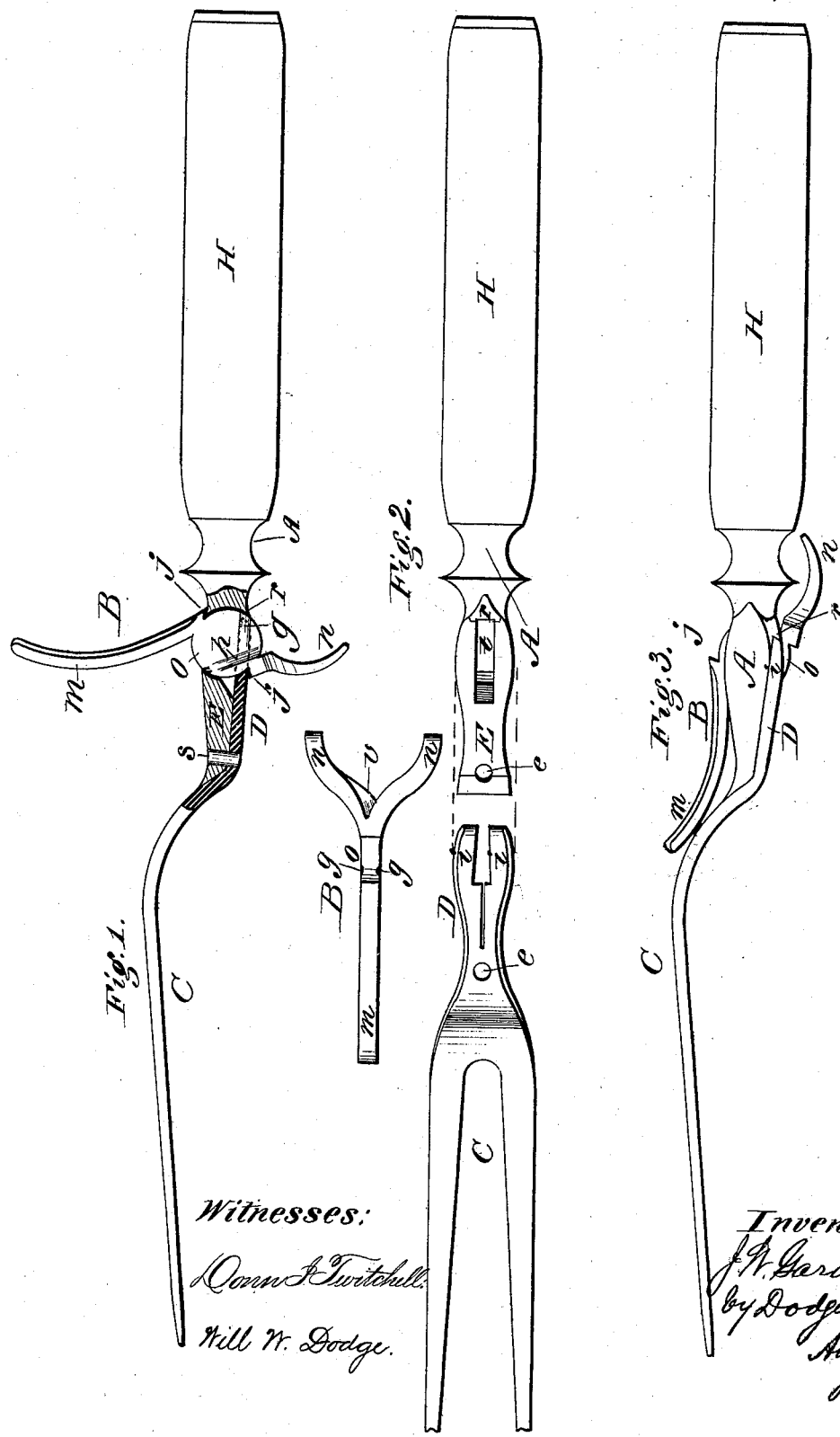

JOSEPH W. GARDNER, OF SHELBURNE FALLS, MASSACHUSETTS.

IMPROVEMENT IN CARVING-FORKS.

Specification forming part of Letters Patent No. 201,663, dated March 26, 1878; application filed May 19, 1877.

*To all whom it may concern:*

Be it known that I, JOSEPH W. GARDNER, of Shelburne Falls, in the county of Franklin and State of Massachusetts, have invented certain Improvements in Carving-Forks, of which the following is a specification:

My invention relates to carving-forks; and the invention consists in making the tines and the tang of two separate parts, the former of steel and the latter of malleable iron or other cheap material; and it further consists in forming the shank with a socket, so made that when the parts are united it will receive and properly hold a guard, which is so constructed as also to serve as a rest to support the fork, as hereinafter more fully set forth.

Figure 1 is a side elevation of the fork, a portion being shown in section. Fig. 2 represents the parts detached, and Fig. 3 shows the fork complete.

In constructing a fork on my present plan I first make the tang A of malleable iron, either cast or wrought, in order to cheapen its production, and make its rear part either flat or round, according to the kind of handle to be used, the drawing representing the round tang and handle H, such as is generally used on carving-forks. The front end of this tang A in front of the bolster is made flat on its under side, and has a vertical mortise or socket formed in it to receive the circular body o of the guard B, the front and rear sides of this socket being made circular, to correspond with the form of the body o of the guard, as shown in Fig. 1. I then make the tines C of steel, in a separate piece, as shown detached in Fig. 2, the rear portion D being made flat, so as to fit against the flat face of the front part E of the tang when the two parts are put together, as shown in Figs. 1 and 3. This rear end or extension D of the tines has a slot in its rear end, from which a slit extends forward, thus forming two spring-arms, *i*, as shown.

The guard B consists of a circular central body, o, from the upper edge of which projects an arm, m, which constitutes the guard proper, and it has projecting from its lower edge two curved legs, n, which serve as feet, upon which the fork is supported when properly adjusted for use. On one or both sides of the circular body o of the guard B there are formed two grooves, g and h, they being so arranged that when the guard is raised, as in Fig. 1, the spring-arms *i* of the part D will engage in the groove g, thereby locking the guard up, as shown, and when the guard is turned down the arms *i* will engage in the notch h, thereby locking the guard down, as shown in Fig. 3.

As shown in Fig. 1, the guard B is formed with a shoulder, j, on each edge at the junction of the arms m and n with the body, which serve as stops to prevent the guard from moving beyond the proper point, and holding it firmly against any accidental pressure of the knife when in use.

At the point where the rear ends of the spring-arms *i* terminate there is formed on the tang A an overlapping lip or projection, r, under which the rear ends of the arms *i* engage, as shown in Fig. 3, they being correspondingly beveled, and whereby they are held in close contact at that point with the tang.

As shown in Fig. 2, a hole, e, is made in the parts D and E, by which the tines and the tang may be united by the insertion of a rivet, s, as shown in Fig. 1.

The parts being thus constructed, the guard B has its arm m thrust up through the socket or mortise t, with its body o resting therein, when the tines C are put in place, the rivet s inserted and headed down, after which the fork is ground and polished in the usual manner, and is then complete.

By this construction it will be seen that the guard has no journal on which it turns, as is usual, the circular body o serving as the journal or pivot, it being held in place by the part D of the tines, which bear against its under edge, as shown in Fig. 1.

This construction is exceedingly cheap and compact, and not liable to get out of order, and it gives to the fork a neater appearance than where the guard is made to straddle the shank, as in my patent of May 5, 1874.

Having thus described my invention, what I claim is—

1. A fork having its tines and its tang constructed of separate pieces and riveted together, substantially as set forth.

2. The combination of the tang A, provided with the socket $t$, the guard B, provided with the circular body $o$, and the tines C, provided with the slotted extension D, all constructed and arranged to operate substantially as shown and described.

3. The guard B, provided with the grooves $g$ and $h$, in combination with the spring-arms $i$, arranged to operate as described, whereby the guard is held in place, as set forth.

JOSEPH WILLIAM GARDNER.

Witnesses:
CHAS. M. SMITH,
SAML. D. BARDWELL.